United States Patent
Schatz

[11] Patent Number: 5,836,152
[45] Date of Patent: Nov. 17, 1998

[54] PROCESS FOR REDUCING THE EXHAUST GAS EMISSIONS OF AN INTERNAL COMBUSTION ENGINE FOR MOTOR VEHICLES WITH CATALYTIC CONVERTER

[75] Inventor: Oskar Schatz, Gauting, Germany

[73] Assignee: Schatz Thermo Gastech GmbH, Erling-Andechs, Germany

[21] Appl. No.: 704,564

[22] PCT Filed: Jan. 10, 1996

[86] PCT No.: PCT/EP96/00091

§ 371 Date: Sep. 10, 1996

§ 102(e) Date: Sep. 10, 1996

[87] PCT Pub. No.: WO96/21803

PCT Pub. Date: Jul. 18, 1996

[30] Foreign Application Priority Data

Jan. 10, 1995 [DE] Germany .......... 195 00 472.8

[51] Int. Cl.[6] .......... F01N 5/02
[52] U.S. Cl. .......... 60/274
[58] Field of Search .......... 60/274, 292, 299, 60/324

[56] References Cited

U.S. PATENT DOCUMENTS

| | | | |
|---|---|---|---|
| 4,929,581 | 5/1990 | Steinwandel et al. | 60/299 |
| 5,125,231 | 6/1992 | Patil et al. | 60/274 |
| 5,517,820 | 5/1996 | Kuroda et al. | 60/274 |
| 5,613,359 | 3/1997 | Zahn et al. | 60/274 |
| 5,765,368 | 6/1998 | Matsumoto et al. | 60/274 |

*Primary Examiner*—Marguerite MaMahon
*Attorney, Agent, or Firm*—Harness, Dickey & Pierce, PLC

[57] ABSTRACT

In order to reduce the exhaust gas emissions of an internal combustion engine (10) for automotive vehicles including an exhaust gas catalytic converter (18), a ram condition will be generated at least during the starting phase in the exhaust gas conduit (16), which ram condition provides for an increase of pressure at the exhaust gas outlet of the engine of at least 0.5 bar, preferably of at least 1 bar, and the engine is additionally loaded at rapid load and speed changes.

37 Claims, 9 Drawing Sheets

PROCESS FOR REDUCING THE EXHAUST GAS EMISSIONS OF AN INTERNAL COMBUSTION ENGINE FOR MOTOR VEHICLES WITH CATALYTIC CONVERTER

DESCRIPTION

The present invention relates to a method for reducing exhaust gas emissions of an internal combustion engine for automotive vehicles with an exhaust gas catalytic converter and an exhaust gas system for such engines.

At cold start of an internal combustion engine substantial exhaust gas emissions excape into the ambient air within the first minute even when an exhaust gas catalytic converter is used. The detrimental emissions, in particular HC, CO and $NO_x$, are due to incomplete combustion and high friction at the still cold engine masses as well to bad, instable processing of the fuel air mixture which is compensated by excess fuel. Furthermore during acceleration phases very distinct emission maxima directly related to actuation of gear mechanisms are observed, which inherently results in rapid load and speed changes. Because during these phases mixture formation is uncontrolled, dynamic mixture discrepancies between fuel delivery and air flow rates result, and the temperatures in the combustion chamber, in particular the temperature gradients in the combustion chamber walls, are subject to substantial transient changes. As a result maximal emissions of HC, $NO_x$ and CO will occur within seconds.

For example maximal emission of HC occurs at initial loading of the engine, maximal emission of $NO_x$ occurs when the gear change speed at full load has been reached, and during gear change maximal emission of CO occurs at an overrich fuel-air-mixture condition, and maximal emission of $NO_x$ occurs at a lean mixture condition. At the same time the catalytic converter is still old and accordingly ineffective so that noxious exhaust gases will escape without being processed until the catalytic converter will have been sufficiently heated.

With Diesel engines additionally substantial smoke, noise and smell will develop at the start and at acceleration from the start.

High quality catalytic converters are sufficiently effective about 50 sec after starting of the engine, while the first HC emission maximum occurs already 20 sec after starting of the engine in the CVS test when the automotive vehicle starts to move and accordingly the engine is accelerated at high load.

There have been attempts to advance the time when the catalytic converter becomes effective by electrical heating of the catalytic converter. Such electrical heating is expensive, cumbersome, results in substantial electrical energy consumption and has no influence on the generation of the emissions within the engine.

It is an object of the invention to favourably influence, in a cost effective manner, the heating of the emission relevant motor parts, in particular the combustion chamber walls, and the coated catalytic surfaces of the catalytic converter, at least a partial surface preferably at the inlet of the catalytic converter, such that the exhaust gas emissions of the engine are reduced and the catalytic converter operates effectively already when the engine is accelerated to start to move the vehicle. In order to achieve this goal, the temperatures of the gas in the combustion engine and in the catalytic converter shall be increased very rapidly to a level as high as possible. A further object is to avoid maximal emissions due to rapid load and speed changes and due to instable mixture formation.

The solution of this object consists in that there will be provided, at least at cold start, a ram pressure condition in the exhaust gas conduit to generate a pressure increase of more than 0.5 bar at the exhaust gas outlet of the engine, and by additionally loading the engine at rapid load and speed changes.

Due to the ram pressure condition density and temperature of the exhaust gases are increased and the engine is forced to process more fuel. Due to the compressed hot exhaust gases heat transfer at the walls of the engine combustion chambers and exhaust gas conduit and at the active surfaces of the catalytic converter is improved.

Tests have shown that a ram pressure of up to 0.5 bar will result in an only slight improvement of the emission values and that the ram pressure should be increased to preferably above 1 bar.

The additional engine loading at rapid load and speed changes can be obtained for example by correspondingly retaining the exhaust gases or by other engine brakes and will maintain the temperature conditions in the combustion chambers, in particular the temperature gradients in the combustion chamber walls, and will reduce the occurence of dynamic mixture formation faults. This allows to avoid maximal emissions otherwise occurring.

Due to the influence of the measures of the invention upon the process in the combustion chamber, mixture formation can be controlled at an earlier time, to which end an oxygen probe following the catalytic converter can be used.

In view of reduction of the maximal torque of the engine ram pressure should be generated only if there is a heat demand, in particular during the first cycle in the first phase (cold start) of the US FTP-75-test. Accordingly it is preferred that the exhaust gas pressure is controlled such that ram pressure is high when the engine is not loaded by torque, and that ram pressure will be reduced when the engine is being heavily loaded.

A preferred strategy to control the ram pressure for preventing emission maxima consists in that, in particular at a change of the transmission ratio, the ram pressure

- is of a maximal value depending on the respective operative temperature during idle and coasting conditions,
- is being reduced at the beginning of torque loading in accordance with the reciprocal value of the torque and is fully cancelled when the torque exceeds half of the maximal torque value,
- is being increased in accordance with the reciprocal value of the torque, when the torque begins to be decreased and will be below half of the maximal torque value, and will reach its maximal value dependent on the operative temperature when the torque has reached or is below idle torque.

A particularly advantageous embodiment of the method consists in that fluid flow from the ram pressure area occurs discontinuously. Due to the discontinuous operation the exhaust gas will flow intermittently through the catalytic converter at very high flow velocity so that heat transfer at the coated catalytic surfaces is particularly effective.

Preferably the means for generating the ram pressure is switched off as soon as the exhaust gas catalytic converter has been activated, in order to unload the engine.

A preferred embodiment consists in that ram pressure is generated upstream of a prearranged catalytic converter of smaller dimensions positioned upstream of said first mentioned catalytic converter which serves as the main catalytic converter. Because the prearranged catalytic converter can be heated more rapidly to its ignition temperature due to its smaller active surface, the measures of the invention will become effective more rapidly with the prearranged catalytic converter.

In order to ensure that as much heat as possible will be transferred to the coated catalytic surfaces to be heated, a further advantageous measure consists in that hot exhaust gas flowing from the ram pressure area is retained in a rapidly to be heated catalytic converter area during a controllable retaining period. According to a first alternative the area of the catalytic converter which is to be heated rapidly may contain said prearranged catalytic converter. However, it may be of advantage that, according to a second alternative, the catalytic converter area to be heated may include said prearranged catalytic converter and said exhaust gas catalytic converter; to this end a storage volume in the ram pressure area may be helpful if desired.

According to a particularly advantageous embodiment of the invention hot exhaust gases are discharged from the ram pressure area in the following cycle:

loading the empty catalytic converter area rapidly to be heated by hot gases from the ram pressure area, retaining the hot exhaust gases in said catalytic converter area, unloading said catalytic converter area.

Preferably, prior to loading of the catalytic converter area to be rapidly heated suction pressure may be generated therein, and during the loading thereof an overpressure may be generated therein. As a result the speed of the exhaust gas flowing into the exhaust gas catalytic converter is additionally increased, and due to the so-called heat dissipation gas velocity is transformed into heat, with a heat increase by a factor up to 1.4 in relation to absolute temperature will occur according to laws of physics.

These gas dynamic effects are enabled if sufficiently rapidly opening and closing valves for loading and unloading of the catalytic converter area rapidly to be heated are available and if the duration of opening said valves during loading is chosen to be short enough so that the exhaust gases flowing in at high speed and being retained in said catalytic converter area are prevented from flowing back, and the duration of opening said valves during unloading is selected to be short enough so that the gases exiting at high speed and generating an underpressure are prevented from flowing back.

In order to provide for said ram pressure condition the exhaust gas system for performing the method of the invention includes at least one freely actuatable valve in the exhaust gas conduit. According to a first alternative this valve may be arranged upstream of the catalytic converter whereby the velocity of the gas within the catalytic converter is increased so as to improve heat transfer at the active surfaces of the catalytic converter. According to a second alternative the valve may be arranged downstream of the catalytic converter whereby the pressure within the catalytic inverter is increased so as to improve heat transfer, too.

The better heat transfer is, the higher is the temperature gradient and the higher is the resulting temperature of the loaded surfaces with energy consumption being the same.

Due to intermittent control by means of valves in the exhaust gas conduit deceleration of the exhaust gas can be controlled very precisely by means of the ratio of flow duration to total duration.

A very simple method of influencing heat production of the engine in accordance with demand, with a valve disposed in the exhaust gas conduit and periodically displaced between open and closed positions, the duration of open position and the duration of closed position are correlated to each other such that a constant ram pressure corresponding to the heat demand will result.

Accordingly a simple valve displaceable between two positions will allow to continuously adapt ram pressure to the respective operative conditions by increasing the proportion of duration of the closed valve position with respect to that of the open position in response to an increase of the heat demand.

From German patent 31 03 098 it has become known, for heating the vehicle cabin, to provide an exhaust gas-water-heat exchanger at the inlet of the exhaust gas branch line with a restriction adapted to be turned on and off, by which restriction the velocity of fluid flow in the exhaust gas branch line is increased in order to increase heat transfer when the engine does not produce much heat, i.e. in particular at partial load or at idling, and to maintain sufficient heating. While the restriction results in an exhaust gas ram pressure condition, the latter is provided during continuous operation and generally only when the engine and a possibly present catalytic converter have reached already their optimal operative temperatures, not however intentionally during the starting phase of the engine since the problem which the prior art structure is concerned with is substantially different from the problem to be solved by the present invention.

A particularly preferred embodiment consists in that a freely actuatable valve is arranged both upstream and downstream of the exhaust gas catalytic converter and that the opening and closing times of said two valves are correlated such that after closing of the upstream valve and prior to opening of the downstream valve a suction pressure is generated in the area between the two valves by short-time opening of the upstream valve.

A further advantageous embodiment consists in that a prearranged catalytic converter of smaller dimensions is disposed upstream of said exhaust gas catalytic converter. The prearranged catalytic converter can be connected in series to the downstream main catalytic converter. Preferably, however, the prearranged catalytic converter is disposed in a bypass of the exhaust gas conduit adapted to be made operative and inoperative such that the prearranged catalytic converter may provide for increased flow resistance for enhancing rapid heating, whereas a catalytic converter operative during all operative conditions must be designed so as to provide for minimal pressure losses. A further advantage of bypass operation of the prearranged catalytic converter is its long-lasting service life, because the prearranged catalytic converter is operative only during the starting phase and accordingly is not subjected to the high loads due to the hot exhaust gases at full load, which is the main cause for aging of catalytic converters. Accordingly during the starting phase with maximal emissions a practically non-aging catalytic converter is provided by said prearranged catalytic converter.

According to a further advantageous embodiment said bypass includes a freely actuatable valve upstream and downstream of said prearranged catalytic converter and connected in parallel to said bypass, such that closing the valve in the exhaust gas conduit will conduct the exhaust gas through the bypass, while the two valves provided in the bypass will be used for generating the ram pressure and the heat dissipation at the prearranged catalytic converter in the manner as explained above.

An advantageous alternative thereof consists in that a freely actuatable valve is disposed upstream of the prearranged catalytic converter in said bypass and a freely actuatable valve is disposed downstream of said bypass and upstream of said main catalytic converter and a freely actuatable valve is disposed so as to be connected in parallel to the bypass in said exhaust gas conduit, because this will seal the valve which conducts the exhaust gas flow through the bypass and is connected in parallel to the bypass, so as to enable high ram pressures.

In particularly efficient engines the known use of latent heat storages loaded by engine exhaust heat for heat delivery to heat consumers in the automotive vehicle is not possible because in operation there is not sufficient heat for loading the latent heat storage. An example thereof is a Diesel engine with direct fuel injection and of piston displacement of less than 2 liter. Since future development is towards such engines, the present invention may provide a means for increasing heat production of the engine.

Accordingly a further advantageous embodiment of the invention provides that an exhaust gas heat exchanger is included in the exhaust gas conduit so that the additionally generated heat can be transferred via the cooling water to the combustion chamber walls for increasing its surface temperature, as well as to the gear box and engine oil so as to reduce exhaust gas emissions and fuel consumption. In this connection it is particularly advantageous if a latent heat storage is included in the cooling water circuit so that by advanced operation of the cooling water circuit, for example activated by a door contact, heat is delivered from the latent heat storage already prior to starting of the engine.

A particularly advantageous embodiment consists in that the internal combustion engine includes a starter which has associated therewith a remote control including means for bridging the ignition lock, and said bridging means includes a timing member arranged to interrupt flow of ignition current when a predetermined time period has expired. In this connection said remote control is connected to the lock of the driver's door such that the engine is started when said door is opened. Operation of the engine in advance for about 30 sec in connection with a ram condition according to the invention is sufficient at cold start to avoid emission maxima when the vehicle is being started. It is this duration of 30 sec which it generally takes for the driver to sit down in the vehicle after actuation of the door lock and to finish his preparatory operations for starting the vehicle. If the driver has not inserted the key into the ignition lock and has not switched on the ignition after expiry of the predetermined time period of for example 30 sec, advance operation is stopped by interrupting the ignition current flowing through the bridging means.

For generating an effective ram situation an effective throttle means is of particular importance. In prior art flap valves pressure losses by leakage cannot be avoided. This is why a further very advantageous embodiment of the invention provides a throttle valve for the above explained exhaust gas system including a housing surrounding a flow passage and a valve flap pivotal about an axis of rotation extending across the flow cross section of the valve, the surface of the valve flap being subdivided into a pair of partial surfaces by said axis of rotation, which is characterized in that said valve flap when it is in its closing position extends in a closing plane which contains said axis of rotation and extends transversely to the flow direction, and is spaced at its edge in all positions on all sides in the plane of the valve flap from the housing a distance such that this distance cannot be overcome by thermal expansions to be expected in operation, that the peripheral area of each partial surface of the housing has associated therewith an abutment edge extending to the axis of rotation, and said abutment edges are disposed on different sides of the valve flap and are associated therewith so as to form a face seal.

Such a valve allows, due to its face sealing, to generate a ram pressure of 5 bar; on opposite sides of the pivot axis of the valve flap the ram pressure generates opposite torques such that the valve flap can be controlled by relatively small forces.

Since the ram means has an influence upon fuel consumption, it is desirable at least in connection with Otto-type engines to adapt operation of the ram means to the heat demand which is high with low engine loads and low with high engine loads. Accordingly it is an advantageous embodiment of the system to provide ram means controllable degressively in response to the volume flow rate in the exhaust gas conduit; in this connection one embodiment is to design the above described throttle valve such that the axis of rotation extends through an off-center area of said valve flap and a bias force engages, via a lever, said valve flap such that the effective lever arm between the line of action of said bias force and said axis of rotation of the valve flap decreases when the opening of the valve flap increases, and that the torque due to said biasing force and said effective lever arm is degressive.

Due to this structure the ram pressure when the valve is closed which will result in a pair of opposite torques of different values at the valve flap, with the resulting torque tending to open the valve flap. The biasing force retains the valve flap in its closed position until the torque resulting from ram pressure overcomes the biasing force. The torque acting in the closing direction will decrease the more the further valve flap will be opened, i.e. the ram pressure is automatically reduced when the flow rate in the exhaust gas conduit will increase.

A particularly advantage embodiment provides that said housing comprises a tubular sleeve through which said axis of rotation extends, and a pair of tube portions enclosed by said tubular sleeve, the edges of said tube portions facing the valve flap on opposite sides of said axis of rotation serving as abutment edges for the valve flap in a plane parallel to the plane of the valve flap when it is in its closing position and extending towards the axis of rotation so as to be spaced from the center of rotation for at least half of the wall thickness of the valve flap and extending therebehind thereto outside of the area of pivotal movements of the valve flap. In this connection a simple embodiment consists in that said edges of the tube portions facing said valve flap are subdivided by a stepped portion extending parallel to the axis of rotation into a pair of portions offset with respect to each other in the flow direction of the valve, which offset portions each extend in parallel to the plane of the valve flap in its closing position.

This results in a particularly simple and cost effective structure which is relatively easy to be assembled even under difficult space conditions because the valve housing can be assembled on location and the essential part of the valve consists of the tubular sleeve with the valve flap mounted therein. In as much as the following conduit portions are prepared by respective machining of their ends to be connected to the valve, it is merely necessary to align these conduit portions, to insert them into the tubular sleeve and to fix them thereto.

If machining of the tube ends can be restricted to separate them by an even cut and if furthermore the valve flap is to be moved completely out from the flow cross section when the valve is in its open position, it is possible to use a further valve alternative suited as a throttle device for the method of the present invention, which throttle valve includes a housing enclosing a flow passage, a valve flap adapted to be pivoted about an axis extending outside of the flow cross section of the valve in a direction transverse to the flow direction, and an actuating lever connected to the pivot axis outside of the housing. The improvement according to the invention consists in that the flow passage is defined within the housing by a pair of coaxially spaced tube portions which are enclosed by a flap housing wherein said valve flap with its axis is arranged such that it covers in its closing position the end of the upstream tube portion which opens into said flap housing and forms a plane annular surface in a closing plane containing the axis of said valve flap and extending transversely to the direction of fluid flow, while the valve flap in its opening position is pivoted away from the flow passage between the two tube portions, that said actuating lever is connected to a piston which is loaded by a biasing force towards its position associated with the closing position of the valve flap and is subjected, in the direction of the biasing force, to gas pressure prevailing in the flow passage upstream of the valve flap, the surface of the piston subjected to gas pressure being slightly smaller than the opening cross section of the tube portion covered by the valve flap in its closing position, and that the surface of the piston opposite to said first mentioned piston surface can be selectively subjected to a pressure overcoming said biasing force.

This allows, even with a valve flap which is pivotally mounted at its one side, to compensate the ram pressure at the closed valve flap for the greater part by a counterforce derived from the gas pressure so that only a relatively small additional force is required to close the valve tightly.

An advantageous embodiment consists in that said piston includes a diaphragm separating a pair of chambers of an actuating cylinder, that a push member extending across one of said chambers and projecting therefrom cooperates with said actuating lever and is connected to said piston, and that the chamber across which said push member extends is adapted to be communicated to a pressure source and the other of said chambers communicates with the flow passage upstream of said closing plane.

A further very advantageous embodiment consists in that said biasing force acts upon a lever such that the active lever arm between the line of action of said biasing force and the axis of rotation of said valve flap decreases in response to a movement of said valve flap towards its opening position, and that the torque resulting from said biasing force and said active lever arm is degressive.

With pivotal flap valves it generally is not possible to completely avoid certain aerodynamic instabilities. A further advantageous embodiment therefor relates to a throttle valve without such an undesired effect. A further advantageous embodiment therefor relates to a throttle valve including a valve member loaded by a biasing force, wherein the valve housing and said valve member are of cross sections associated to each other such as to form a system of restricted passages which are dimensioned such that the surface of the valve member which is subjected to said ram pressure increases in response to movements of said valve member in a direction opposite to said biasing force.

In this connection preferably the restricted passages, the cross section of the valve member and said biasing force are correlated such that, at high volume flow rates, the surface of the valve member which is subjected to ram pressure is sufficiently large so that the ram pressure necessary for holding the valve member in its opening position does not exceed the ram pressure necessary for moving the valve member to its opening position.

An advantageous embodiment consists in that said valve housing has an inlet orifice opening in the direction of movements of said valve member and being of a cross section which is small as compared to the cross section of said valve member, and a chamber for receiving said valve member and including an outlet orifice arranged to enable passage of said valve member and to form an annular gap. The inlet orifice preferably is provided at the end of a thin-walled tubular portion projecting into the valve chamber.

According to an alternative the chamber in the valve housing and the outlet orifice are of the same cross section. According to another alternative it is possible that the chamber in the valve housing is of a greater cross section than the outlet orifice.

In an advantageous embodiment the valve member is of a uniform cross section.

Preferably the biasing force can be switched off in order to cancel throttle operation when it is not desired. To this end a valve spring for generating said biasing force may be supported against an abutment (152) which is adjustable in the direction of action of said spring.

These valves including a valve member which is linearly movable in a valve chamber are not particularly suited for the exhaust gas main stream because they are not able to open completely the flow cross section. This is why they are suited in particular for systems wherein the throttle action is provided in a bypass of the main stream.

The invention will be explained in more detail with reference to the following description of the embodiments shown in the drawing.

DETAILED DESCRIPTION

Figure 1:
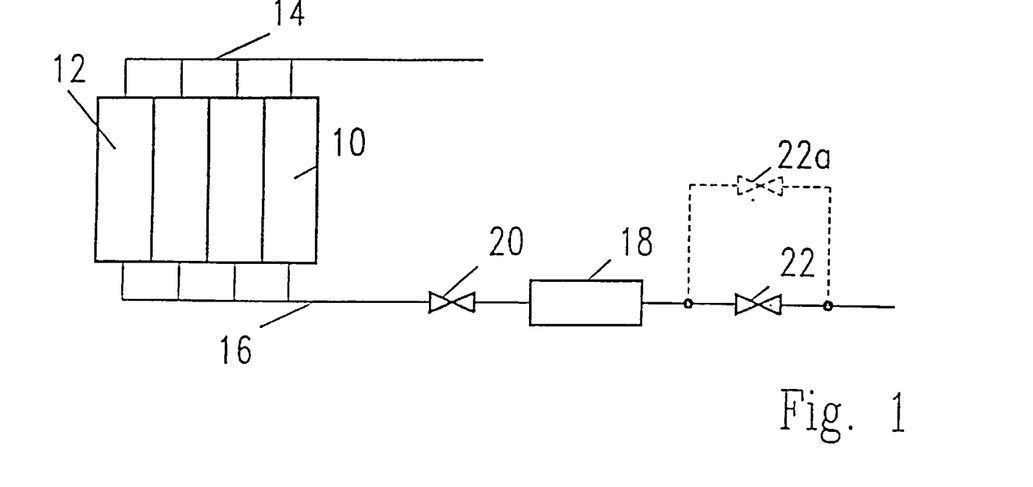
FIG. 1 is a schematic diagram of a four cylinder combustion engine for automotive vehicles having an exhaust gas catalytic converter in the exhaust conduit.

In an internal combustion engine 10 combustion chambers 12 are connected to a combustion air conduit 14 and an exhaust gas conduit 16. For reducing noxious emissions the exhaust gas conduit 16 includes an exhaust gas catalytic converter 18. A valve 20 is provided between the engine 10 and the exhaust gas catalytic converter. A further valve 22 is shown in FIG. 1 to be downstream of exhaust gas catalytic converter 18.

For the simpliest arrangement to practice the invention it is sufficient to provide one of valves 20 and 22. The selected valve 20 or valve 22 can be adjusted such that a ram pressure is obtained upstream of the selected valve so as to increase the density and temperature of the exhaust gases and to force the engine to process additional fuel so that heat transfer at the walls of the combustion chambers 12 and the coated active surface of the exhaust gas catalytic converter is increased.

If it is valve 20 which is selected, the exhaust gases flow at increased velocity into the exhaust gas catalytic converter 18. If it is valve 22 which is selected, increased pressure will prevail within the exhaust gas catalytic converter. In both cases heat transfer to the active surfaces is improved.

An improved operation will be obtained when the selected valve is not held in a fixed position so as to allow for continuous flow from the ram pressure area, but if the selected valve is intermittently opened and closed so that velocity additionally will be increased when the valve is opened so as to further improve heat transfer.

However, it is preferred to provide not only one of the two valves 20 and 22, but both valves simultaneously and to control the valves in a predetermined cycle such that valve 22 is closed after the exhaust gas catalytic converter 18 has been unloaded and thereafter valve 20 is opened in order to load the exhaust gas catalytic converter 18 with hot exhaust gases flowing from the ram pressure area at high velocity, and thereafter to close valve 20 again timely enough so that an overpressure within the exhaust gas catalytic converter along with a temperature and density increase will result. Thereupon, after expiry of a predetermined period, valve 22 is opened to unload the exhaust gas catalytic converter 18 so as to generate an underpressure and thereafter to close it again. Then the cycle will be repeated.

In this mode of operation intermittent flow of the exhaust gases, the temperature of which has been increased already due to the ram pressure condition, will further improve heat transfer to the active surfaces by heat dissipation and by the gases staying therein for the predetermined period.

FIGS. 6 to 14 show valves which are suited to automatically and degressively control the ram pressure. The valve structures shown in FIGS. 7 to 12 are not suited to completely clear the total flow cross section when they are in their open positions. The use of such valves in the exhaust gas main stream is not desired; on the other side they have the advantage of being aerodynamically stable. This is why in FIG. 1 an embodiment of such valve is shown by brokenlines, it being assumed that in this case valve 22 is a shut-off valve, and an automatically degressively controlled throttle valve 22a is disposed in the bypass so that the gases flow through the throttle valve 22a when valve 22 is closed, while the total flow cross section is open when valve 22 is opened.

Figure 2:
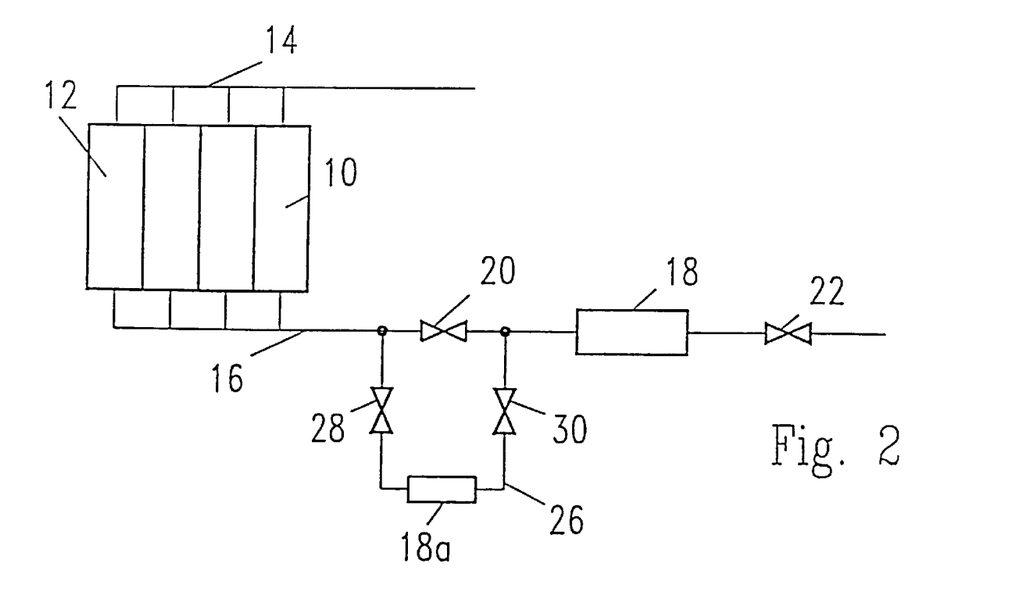
FIG. 2 is an arrangement similar to that of FIG. 1 and including a prearranged catalytic converter in a bypass assembly.

FIG. 2 shows an additional smaller prearranged catalytic converter 18a which is connected in parallel to valve 20 by a bypass 26, a freely actuatable valve 28 being disposed upstream of prearranged catalytic converter 18a and a similar valve 30 is disposed downstream of prearranged catalytic converter 18a.

One advantage of the prearranged catalytic converter 18a is that its active surfaces due to their smaller dimensions can be heated by the exhaust gas flow more rapidly to the ignition temperature than the more extended actice surfaces of the exhaust gas catalytic converter 18 so that emissions are reduced more rapidly. Furthermore, prearranged catalytic converter 18a is used only during the starting phase until exhaust gas catalytic converter 18 is activated so that the prearranged catalytic converter will have a long life time as mentioned above.

The prearranged catalytic converter 18a can be operated in the same manner as explained with respect to exhaust gas catalytic converter 18. To this end valve 20 is closed and valve 22 is opened whereupon intermittent control of prearranged catalytic converter 18a is obtained by valves 28 and 30.

An alternative may comprise that valve 30 is positioned in the area between the location downstream of a prearranged catalytic converter 18a where bypass 26 opens into the main stream, and the main catalytic converter 18 so that ram pressure on both sides of valve 20 is the same when valves 20 and 30 are closed, and accordingly valve 20 is tightly sealed which enhances generation of a high ram pressure.

On the other hand it may be suitable to conduct hot exhaust gases intermittently and simultaneously to the prearranged catalytic converter 18 and the following exhaust gas catalytic converter 18. In this mode of operation valve 20 is closed and valve 30 is opened, while the exhaust gas cycle is determined by valves 28 and 22. In view of the relatively large volume between valves 28 and 22 it may be necessary to provide upstream of valve 28 an additional storage volume for the retained exhaust gas, which is shown schematically at 32.

Figure 3:
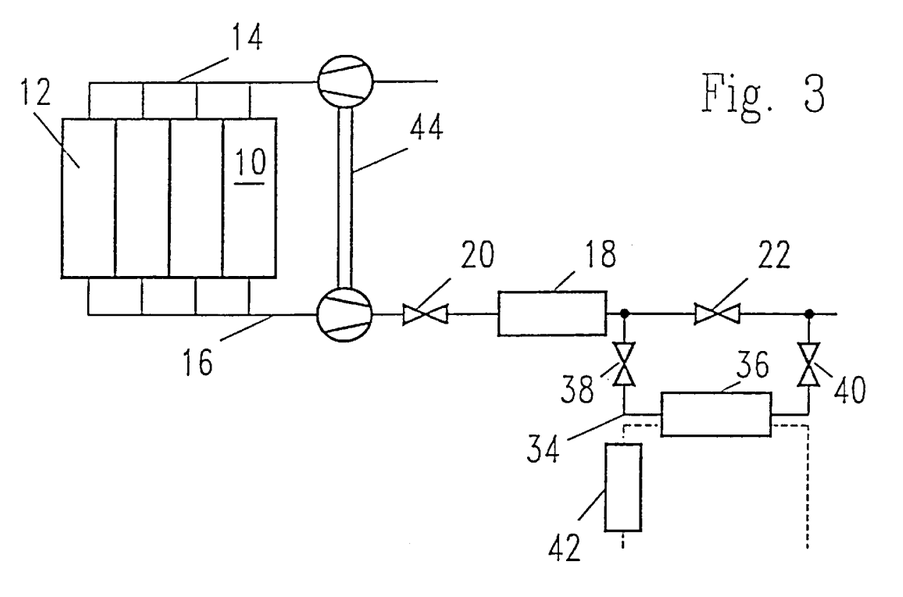
FIG. 3 shows an alternative embodiment including a supercharger and an exhaust gas heat exchanger.

FIG. 3 shows an alternative wherein the method for rapidly heating the exhaust gas catalytic converter may be used simultaneously in a heat exchanger 36 connected in parallel to valve 22 via a bypass 34, which heat exchanger is enclosed in bypass 34 between valves 38 and 40, which can be operated, when valve 22 is closed, in the same manner as has been described above with respect to valve pairs 20, 22 and, respectively 28, 30 or 28, 22. Heat exchanger 36 can be advantageously used for loading a latent heat storage 42 which may preheat the combustion chamber walls by means of the cooling water already before starting the engine so as to drastically reduce the emission maximum otherwise occurring at cold start of the engine.

Since operation according to invention allows to compensate for any temperature losses at the turbine of an exhaust gas turbocharger, use of an exhaust gas turbocharger 44 shown in FIG. 3 is possible without any problems.

Figure 4:
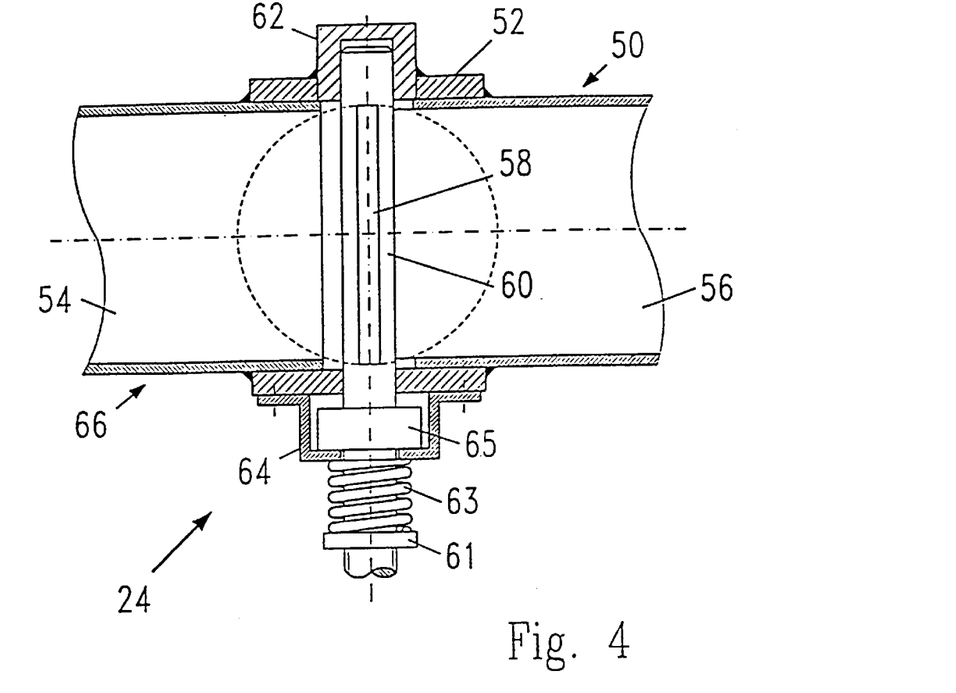
FIG. 4 is a cross section, perpendicular to the pivot axis, of a pivotal flap valve of the invention suited for generating a ram pressure.
Figure 5:
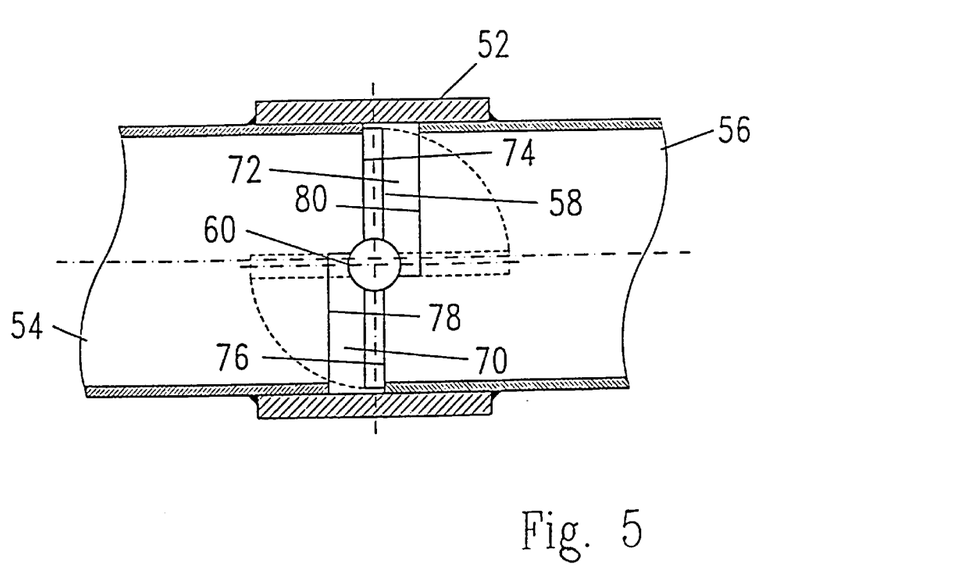
FIG. 5 is a cross section through the valve shown in FIG. 4 in the direction of the pivot axis.

For automatically generating a high ram pressure of for example 5 bar under degressive control a valve 24 may be used, which will be described in more detail with reference to FIGS. 4 to 6.

A tubular exhaust gas conduit designated by 50 has been separated in the area of a tubular sleeve 52, with the two tube portions 54 and 56 being spaced from each other sufficiently to allow insertion of a valve flap 58 therebetween. Valve flap 58 can be a simple stamping and is connected to a pivot axis 60 which is mounted in bearings 62 and 64 adjacent sleeve 52 and extends from sleeve 52 on one side so as to be connected to an actuating or control mechanism.

Tubular sleeve 52 and tube portions 54, 56 extending therein form together valve housing 66. The portion of pivot axis 60 which projects from sleeve 52 is provided with a land 61 forming an abutment for a pressure spring 63 surrounding the pivot axis, which spring urges a sealing flange 65 tightly against the internal side of bearing 64. Sealing flange 65 is disposed within bearing 64 formed as a removable cap and is intergral with axis 60.

Valve flap 58 is spaced from the internal wall of valve housing 66 sufficiently so that the respective spacing allowing for free movements of the valve flap cannot be overcome by dimensional changes to be expected in operation due to thermal expansion.

In the shown example the valve flap 58 when it is in its closing position extends perpendicularly to the direction of fluid flow and to the axis of sleeve 52, and the valve flap 58 when it is in this closing position engages the edges of the two tube portions 54 and 56 facing the valve flap. In order to ensure that the valve flap 58 can move to the closing position without any interference with tube portions 54 and 56, the latter must include, in the area of movements of valve flap 58, recesses 70 and 72, respectively. In the shown example the recesses are created by the fact that the edges of tube portions 54 and 56 on either side of pivot axis 60 have portions which serve as abutment edges 74 and 76, respectively, and which extend towards pivot axis 60 while they are spaced from the pivot center for at least half the thickness of valve flap 58 so as to allow for positioning of the valve flap 58 to be parallel to the fluid flow direction when the valve is in the opening position. The respective adjacent portions 78 and 80 are offset with respect to abutment edges 74 and 76, respectively, so that there is no interference with pivotal movements of valve flap 58 between closing and opening positions.

Pivot axis 60 is positioned offcenter within the flow passage such that the portion of valve flap 58 which engages abutment edge 74 opposite to exhaust gas pressure presents a larger surface than the portion engaging abutment edge 76 in the direction of exhaust gas pressure. As a result the exhaust gas pressure generates a torque tending to open the valve flap, and valve flap 58 can be retained in its closed position only by a biasing force acting opposite to said torque until the torque resulting from exhaust gas pressure will overcome the biasing force.

Figure 6:
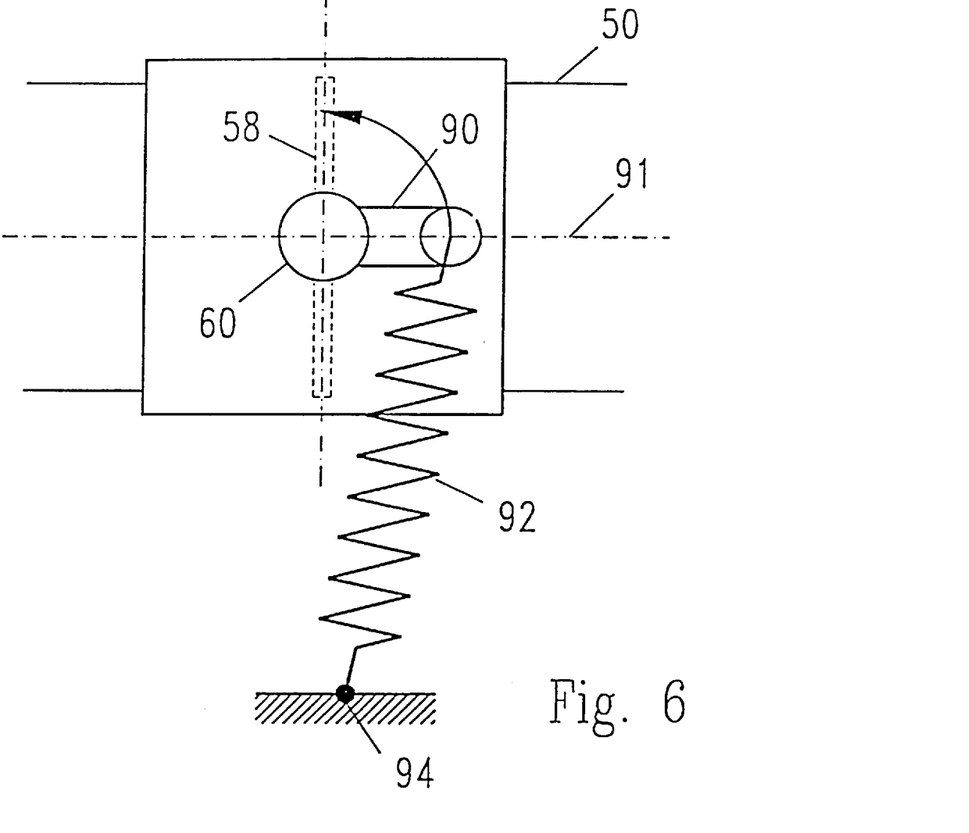
FIG. 6 shows a device for providing a degressive control of the valve flap, FIG. 7 a schematic cross section of a ram device comprising a piston valve in a position adjacent the closing position.

Pivot axis 60 has, as shown in FIG. 6, an angular end portion forming a lever arm 90. A spring 92 which biases valve flap 58 towards its closing position and which is mounted to a pivot 94 engages the free end of lever arm 90 which is more remote from axis 91 of conduit portion 50 than the end of axis 60 which carries lever arm 90. The arrangement is such that the active lever arm between pivot axis 60 and the line of action of spring 92 becomes smaller when the offset mounted valve flap 58 is being moved towards its opening position so that the torque resulting from the spring force and the active lever arm is decreasing.

This allows to use the valve as a ram pressure means in the exhaust gas conduit of internal combustion engines in order to provide for increased heat delivery of the engine by retaining exhaust gas at heat demand conditions, with the fuel consuming ram pressure being automatically reduced in response to increasing mass flow.

The valve flap which is positioned within the exhaust gas stream when the valve is open is aerodynamically somewhat instable. This is avoided with the valve arrangement which will be described with reference to FIGS. 7 to 12; however it is to be noted that these valve flaps do not completely clear the flow cross section when they are in their open positions.

Figure 7:
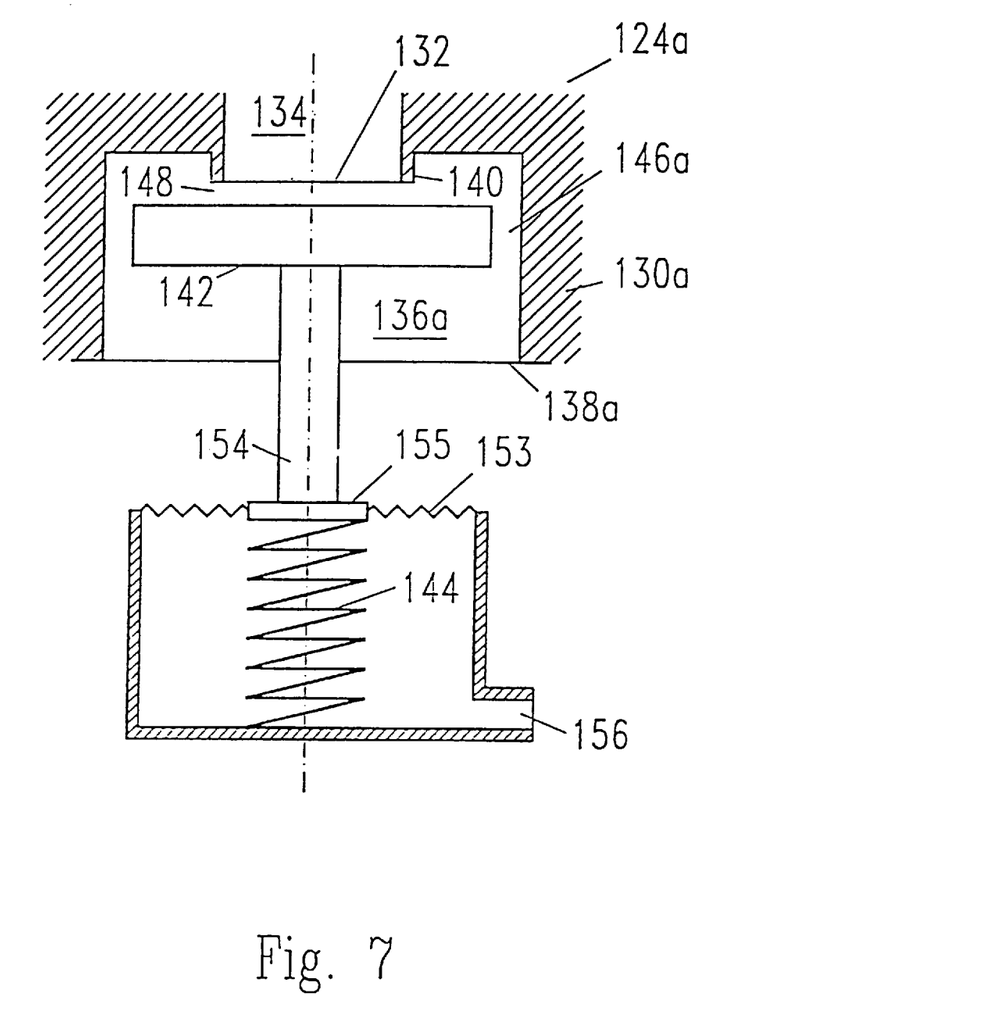
Figure 8:
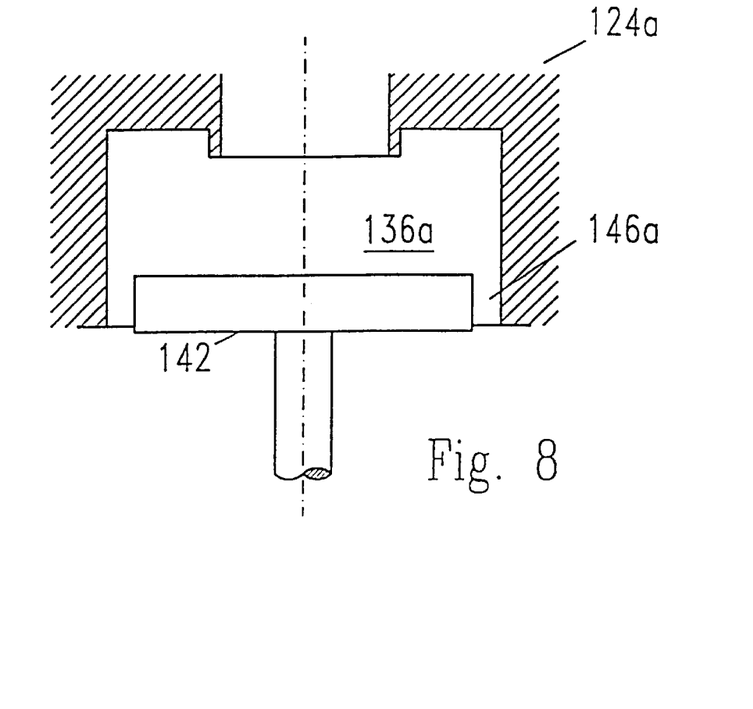
FIG. 8 shows the valve of FIG. 7 in an intermediary position.
Figure 9:
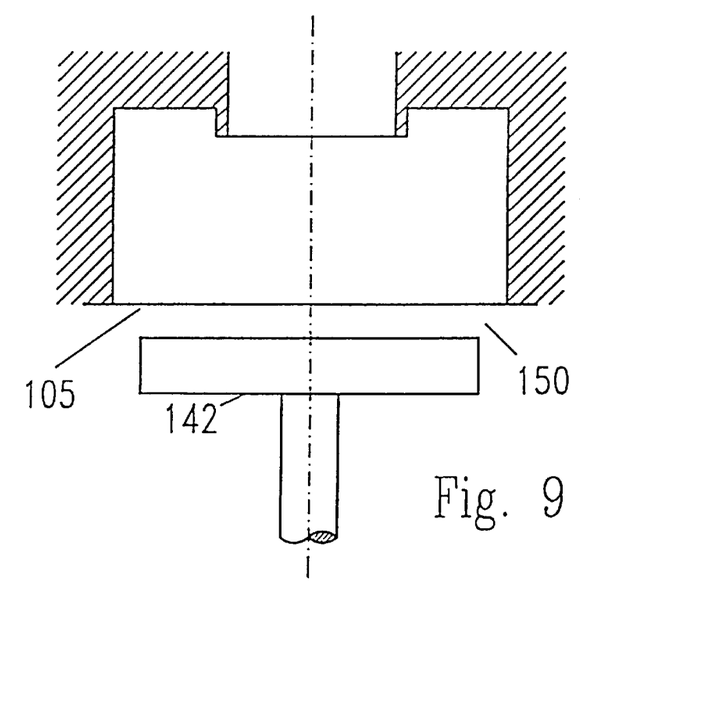
FIG. 9 shows the valve of FIGS. 7 and 8 adjacent the maximal opening position.

FIGS. 7 to 9 show schematically a valve 124a including a valve housing 130a with an inlet orifice 132 at the end of an inlet passage 134, a valve chamber 136a of enlarged cross section positioned downstream of the inlet orifice 132, and an outlet orifice 138a opposite to inlet orifice 132 and being of the same cross section of valve chamber 136a. Inlet passage 134 is comprised of a short tube portion 140 extending somewhat into the interior of valve chamber 136a and provides a seat for valve member 142 which is biased by a compression spring 144 in the direction opposite to the direction of fluid flow between inlet orifice 134 and outlet orifice 138a and which seats upon tubular portion 140 under the action of spring 144 when exhaust gas pressure is not able to overcome the force of spring 144. The cross section of valve member 142 is dimensioned such that between its periphery and the internal wall of valve chamber 136a there will be an annular gap 146 enabling exit of the exhaust gases.

When valve 124a is closed, the pressure of the exhaust gases acts upon only a surface of valve member 142 which corresponds to the cross section of inlet orifice 134. The force of compression spring 144 which has its greatest length when valve 124a is closed and the surface of valve member 142 which is pressurized by the exhaust gases when the valve is closed determine the pressure at which valve 124a opens. As soon as valve 124a opens, the exhaust gases can flow through a radial gap 148 which is increased in response to the valve stroke to the axially extending annular gap 146a which remains the same during movements of the valve member 142 within valve chamber 136a, and the exhaust gases can continue to flow from there through exhaust gas conduit 16 (FIG. 1), with the pressure in radial gap 148 changing in response to movements of valve member 142, i.e. the pressure decreases when valve member 142 moves away from tube portion 140 while the pressure in annular gap 146a is independent of movements of the valve member. The tubular portion 140 having a relatively small face opposite to valve member 142 ensures that during the initial phase of valve opening the ram pressure is determined only by the cross section of inlet orifice 132 and not by the total cross sectional surface of the valve chamber opposite the valve member.

The spring 144 is positioned within a cylinder 152 which is limited at one face thereof by a diaphragm 153. Diaphram 153 is connected on the one side with the wall of cylinder 152 and on the other side with a plate 155 at the end of a push member 154 at the other end of which valve member 142 is situated. Spring 144 extends between plate 155 and the face of cylinder 152 opposite diaphram 153. As long as operation of valve 124a is to be maintained, valve member 142 is loaded by spring 144. If the action of throttle valve 124a and, respectively, of valve 124b to be described in the following is to be cancelled, cylinder 152 is communicated via a conduit 156 to vacuum. As a result the diaphram along with push member 154 is withdrawn into cylinder 152 so far that fluid flow through the throttle valve is unrestricted.

FIG. 8 shows the position of valve member 142 before it leaves valve chamber 136a. When valve member 142 leaves valve chamber 136a as shown in FIG. 9, the annular gap 146a disappears, and there will be provided another radial gap 150 between the opening edge 157 of valve chamber 136a and valve member 142, which increases in size in response to valve movements.

This valve arrangement is designed so that a soft transition between the various ram pressure values which are degressive relative to valve movements will result at relatively small valve movements even though the counterforce generated by compression spring 144 increases in response to increased valve movements.

Figure 10:
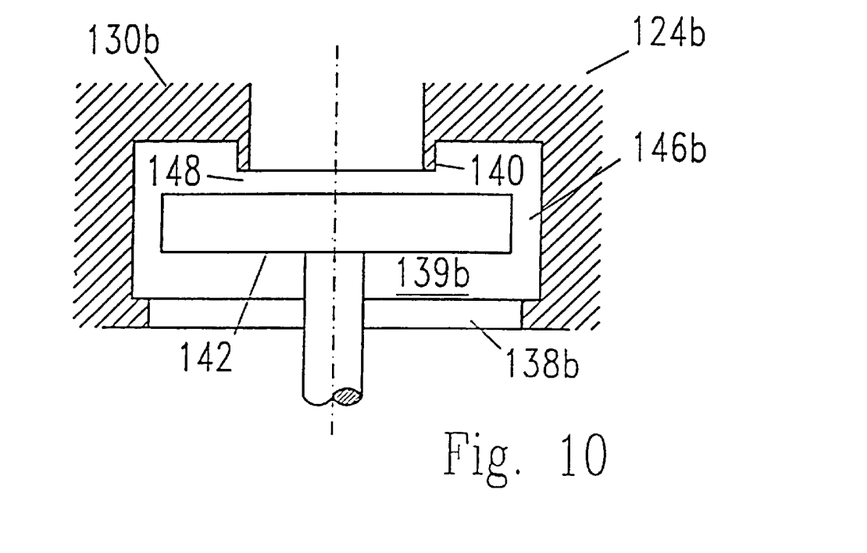
FIG. 10 shows another embodiment of a piston valve in a position adjacent the closing position.
Figure 11:
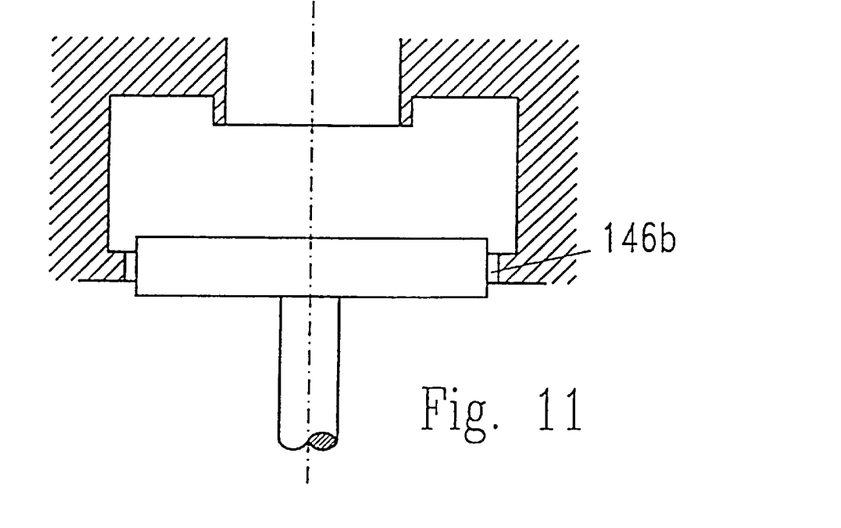
FIG. 11 shows an intermediary position of the valve in FIG. 10.
Figure 12:
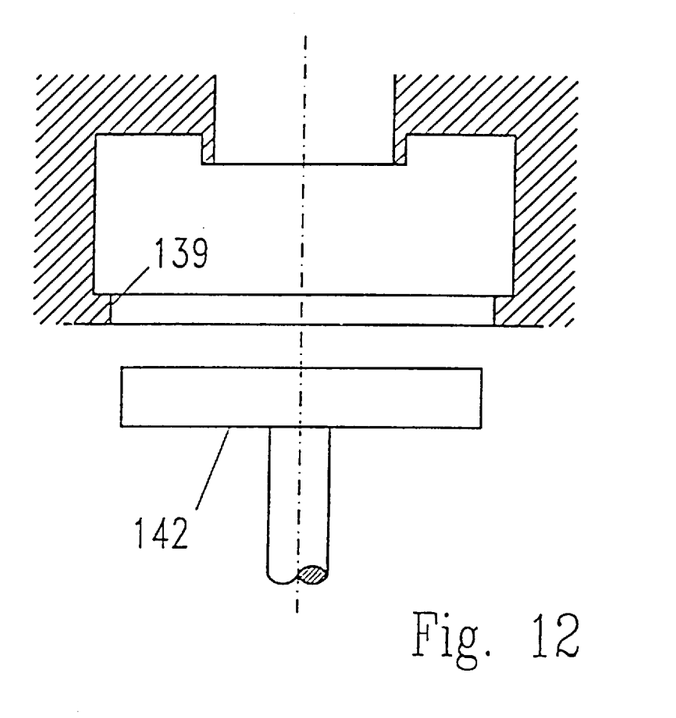
FIG. 12 shows the valve of FIGS. 10 and 11 in a position adjacent the opening position.

FIGS. 10 to 12 show schematically a throttle valve 124b including a valve housing 130b wherein inlet passage 134 again opens into a tube portion 140. The outlet orifice 138b of valve chamber 136b is limited by an annular rib 139 at the wall of valve chamber 136b to a cross section which only slightly exceeds the corresponding dimension of valve member 142. When the ram pressure acting upon the surface of valve member 142 which is cleared by inlet orifice 132 overcomes the counterforce of spring 144, there will be provided a radial gap 148 which increases when valve member 142 moves towards its opening position; the exhaust gases can flow via an axially extending annular gap 146b between valve member 142 and the walls of valve chamber 136b to outlet orifice 138b. This outlet orifice 138b, however, will be reached by valve member 142 already after a short valve stroke and will be transformed into an also axially extending annular gap 146b which is substantially smaller than annular gap 146a as shown in FIG. 11. Only when valve member 142 has left the area of rib 139 (FIG. 12) there will be provided a radial gap 150 which increases when valve member 142 moves further-on.

This valve structure provides in connection with increased valve movements for a sharp transition from high pressure to low pressure due to change of the pressure surface from the cross section of the inlet orifice 132 to the face of valve member 142.

Figure 13:
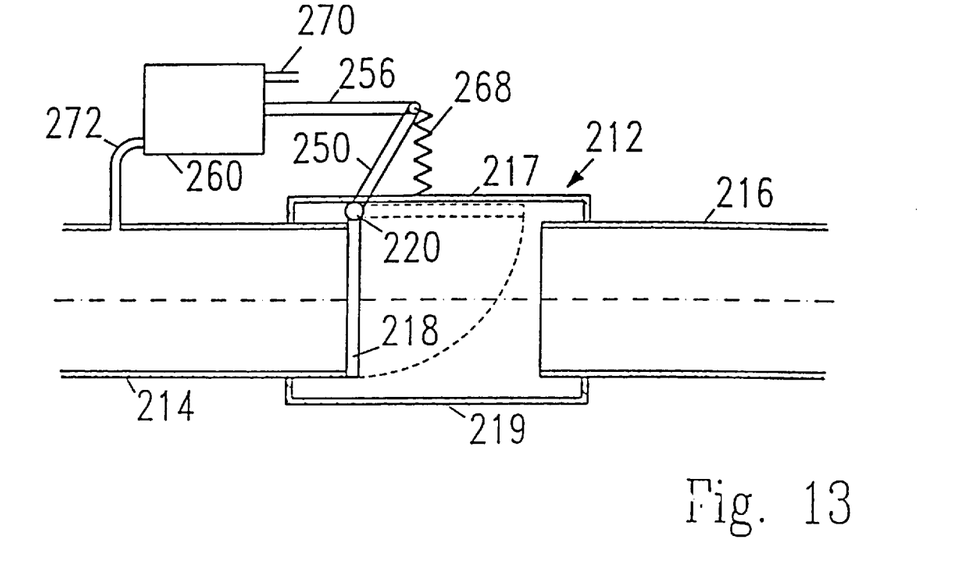
FIG. 13 is a cross section of an alternative embodiment of a pivotal flap valve having a pivotal flap mounted at one side.

FIG. 13 shows a pivotal flap valve 224 wherein the pivotal flap is mounted on one side. A housing 212 instead of annular sleeve 52 (FIG. 5) encloses the two ends of tube portions 214, 216 facing each other and each terminating in a plane annular surface. The end of the upstream tube portion 214 is engaged by a valve flap 218 when it is in its closing position, with the pivot axis 220 of the valve slap extending across the flap housing radially outside of the cross sectional area of tube portions 214 and 216. The flap housing in this area is limited by a surface 217 parallel to axis 220, while the opposite walls 219 of flap housing 212 on this side may be of an arcuate shape concentric to tube portions 214 and 216.

Figure 14:
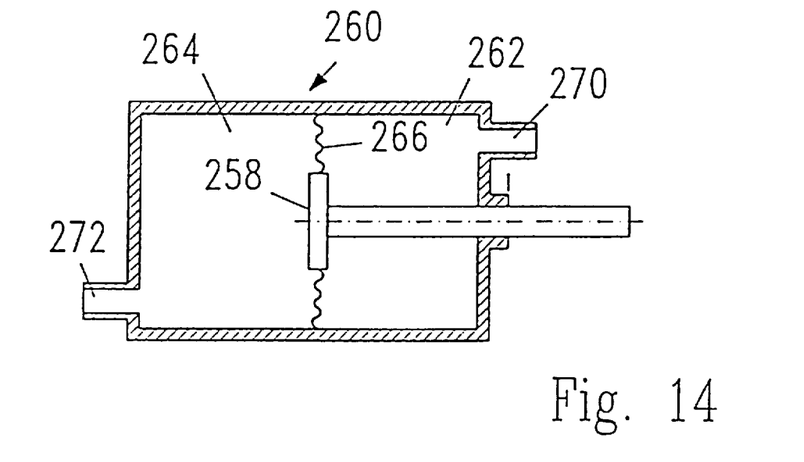
FIG. 14 is an enlarged representation of the device for compensating the ram pressure of this valve.

Pivot axis 220, outside of flap housing 212, is provided with a lever 250 which is engaged by a push member 256 which is fixedly connected to a double acting piston 258 within a cylinder 260. Piston 258 is integrated in a diaphram 266 subdividing cylinder 260 into a pair of chambers 262 and 264.

Chamber 262 through which push member 256 extends communicates via a conduit 270 with a pressure source; the other chamber 264 communicates via a conduit 272 with the tube portion 214 upstream of the closing plane.

A spring 268 engages on the one hand lever 250 and on the other hand housing 212 so as to bias valve flap 218 towards its closing position. The arrangement is such that the effective lever arm between the line of action of the spring force and the pivot axis 220 becomes smaller when lever 250 moves from its position associated with the closed position of the valve to its position associated with the open position of the valve, in order to decrease the torque resulting from the spring force and the lever arm.

The ram pressure which will develop during closing movements of the valve resulting in increased restriction of fluid flow upstream of the closing plane, acts in opposition to the force of the spring 268. Since, however, the ram pressure acts via conduit 272 upon piston 258 in the closing direction of the valve and exerts a slightly smaller force than the ram pressure acting directly upon the closed valve flap 218 due to the surface of piston 258 being smaller as compared to the flow cross section of tube portion 214, a relatively small force of spring 268 is sufficient to retain valve flap 218 in its closed position so that a relatively soft spring 268 may be used.

When operation of the throttle valve is to be cancelled, i.e. valve flap 218 is to be held permanently in its open position, chamber 262 is pressurized via conduit 270 in order to withdraw push member 256 into cylinder 260.

I claim:

1. A method for seducing exhaust gas emissions of an internal combustion engine for an automotive vehicle, said combustion engine including an exhaust gas outlet, an exhaust gas conduit and an exhaust gas catalytic converter, which method is characterized by providing, at least at cold start, a ram pressure condition in said exhaust gas conduit to generate a pressure increase of more than 0.5 bar at the exhaust gas outlet of the engine, and by additionally loading the engine at rapid load and speed changes, and by controlling said ram pressure condition such that ram pressure is relatively high when said combustion engine is under low load conditions, and ram pressure is relatively low when said combustion engine is under heavy load conditions.

2. A method as defined in claim 1 wherein said ram pressure condition provides for a pressure increase of at least 1 bar.

3. A method as defined in claim 1 wherein ram pressure is being decreased in a discontinuous or intermittent manner.

4. A method as defined in claim 3 wherein said ram pressure is generated upstream of said exhaust gas catalytic converter.

5. A method as defined in claim 1 wherein means for generating ram pressure is made inoperative as soon as said catalytic converter has been activated.

6. A method as defined in claim 1 wherein ram pressure is generated upstream of a prearranged catalytic converter of smaller dimensions and positioned upstream of said first mentioned catalytic converter which serves as a main catalytic converter.

7. A method as defined in claim 3 wherein hot exhaust gases flowing from a ram pressure area are retained in an area of said catalytic converter to be rapidly heated during a controllable period.

8. A method as defined in claim 7 wherein said catalytic converter area to be rapidly heated includes said prearranged catalytic converter.

9. A method as defined in claim 7 wherein said catalytic converter area to be rapidly heated includes said prearranged catalytic converter and said main catalytic converter.

10. A method as defined in claim 7 wherein hot exhaust gases are discharged from the ram pressure area in the following cycle:
   loading the empty catalytic converter area rapidly to be heated by hot gases from the ram pressure area,
   retaining the hot exhaust gases in said catalytic converter area,
   discharging the hot gases from said catalytic converter area.

11. A method as defined in claim 10 wherein suction pressure is generated in said catalytic converter area rapidly to be heated prior to loading thereof.

12. A method as defined in claim 7 wherein rapidly opening and closing valves are used for loading and unloading of said catalytic converter area rapidly to be heated, the duration of opening said valves during loading is chosen to be short enough so that the exhaust gases flowing in at high speed and being retained in said catalytic converter area are prevented from flowing back, and the duration of opening said valves during unloading is selected to be short enough so that the gases exiting at high speed and generating an underpressure are prevented from flowing back.

13. A method as defined in claim 6 wherein said catalytic converter area to be rapidly heated includes said prearranged catalytic converter.

14. A method as defined in claim 6 wherein said catalytic converter area to be rapidly heated includes said prearranged catalytic converter and said main catalytic converter.

15. A method as defined in claim 1 for an internal combustion engine including a transmission of a variable transmission ratio, wherein, in particular at a change of the transmission ratio, the ram pressure
   is of a maximal value depending on the respective operative temperature during idle and coasting conditions,
   is being reduced at the beginning of torque loading in accordance with the reciprocal valve of the torque and is fully canceled when the torque exceeds half of the maximal torque value,
   is being increased in accordance with the reciprocal value of the torque, when the torque begins to be decreased and will be below half of the maximal torque value, and will reach its maximal value dependent on the operative temperature when the torque has reached or is below idle torque.

16. A method as defined in claim 1 for an internal combustion engine including a valve disposed in said exhaust gas conduit and periodically displaceable between open and closed positions, in which method the duration during which the valve is in its closed position are correlated such that constant ram pressure corresponding to the respective heat demand will result.

17. An exhaust gas system for an internal combustion engine of an automotive vehicle including an exhaust gas catalytic converter for performing the method of claim 1, wherein the exhaust gas conduit includes at least one freely actuatable valve.

18. An exhaust gas system as defined in claim 17 wherein said valve is disposed upstream of said exhaust gas catalytic converter.

19. An exhaust gas system as defined in claim 17 wherein a freely actuatable valve is disposed downstream of said exhaust gas catalytic converter.

20. An exhaust gas system as defined in claim 19 wherein the opening and closing times of said two valves are correlated such that after closing of the upstream valve and prior to opening of the downstream valve a suction pressure is generated in the area between the two valves by short-time opening of the upstream valve.

21. An exhaust gas system as defined in claim 18 wherein the opening and closing times of said two valves are correlated such that after closing of the upstream valve and prior to opening of the downstream valve a suction pressure is generated in the area between the two valves by short-time opening of the upstream valve.

22. An exhaust gas system as defined in claim 17 wherein a prearranged catalytic converter of smaller dimensions is disposed upstream of said first mentioned catalytic converter which serves as a main catalytic converter.

23. An exhaust gas system as defined in claim 22 wherein said prearranged catalytic converter is connected in series with the main catalytic converter.

24. An exhaust gas system as defined in claim 22 wherein said prearranged catalytic converter is disposed in a bypass of said exhaust gas conduit adapted to be switched on and off.

25. An exhaust gas system as defined in claim 24 wherein said bypass includes a freely actuatable valve upstream and downstream of said prearranged catalytic converter and connected in parallel to said bypass.

26. An exhaust gas system as defined in claim 24 wherein a freely actuatable valve is disposed upstream of the prearranged catalytic converter in said bypass and a freely actuatable valve is disposed downstream of said bypass and upstream of said main catalytic converter and a freely actuatable valve is disposed so as to be connected in parallel to the bypass in said exhaust gas conduit.

27. An exhaust gas system as defined in claim 17 wherein an exhaust gas heat exchanger is associated with said exhaust gas conduit.

28. An exhaust gas system as defined in claim 27 wherein a latent heat storage is associated with a cooling water circuit of said engine.

29. An exhaust gas system as defined in claim 17 wherein the internal combustion engine includes a starter which has associated therewith a remote control including means for bridging the ignition lock, and said bridging means includes a timing member arranged to interrupt flow of ignition current when a predetermined time period has expired.

30. An exhaust gas system as defined in claim 29 wherein said remote control is connected to the lock of the driver's door such that the engine is started when said door is opened.

31. An exhaust gas system for an internal combustion engine of an automotive vehicle including an exhaust gas catalytic converter for performing the method of claim 1 wherein said exhaust gas conduit includes a ram pressure means adapted to be controlled degressively in response to volume flow rate.

32. A throttle valve for an exhaust gas system as defined in claim 17, said throttle valve including a housing surrounding a flow passage and a valve flap pivotal about an axis of rotation extending across the flow cross section of the valve, the surface of the valve flap being subdivided into a pair of partial surfaces by said axis of rotation, wherein said valve flap when it is in its closing position extends in a closing plane which contains said axis of rotation and extends transversely to the flow direction and is spaced at its edge in all positions in all sides from the plane of the valve flap from the housing for a distance such that this distance cannot be overcome by thermal expansions to be expected in operation, wherein the peripheral area of each partial surface of the housing has associated therewith an abutment edge extending to the axis of rotation, and said abutment edges are disposed on different sides of the valve flap and are associated therewith so as to form a face seal.

33. A throttle valve as defined in claim 32 wherein the axis of rotation extends through an off-center area of said valve flap and a bias force engages via a lever said valve flap such that the effective lever arm between the line of action of said bias force and said axis of rotation of the valve flap decreases when the opening of the valve flap increases, and wherein the torque due to said biasing force and said effective lever arm is degressive.

34. A throttle valve as defined in claim 17 and including a housing enclosing a flow passage and a valve flap adapted to be pivoted about an axis extending outside of the flow cross section of said valve flap transversely with respect to the direction of fluid flow and connected to an actuating lever, wherein said flow passage is defined within the housing by a pair of coaxially spaced tube portions which are enclosed by a flap casing wherein said valve flap with its axis is arranged such that it covers in its closing position the end of the upstream tube portion which opens into said flap casing and forms a plane annular surface in a closing plane containing the axis of said valve flap and extending transversely to the direction of fluid flow, while the valve flap in its opening position is pivoted away from the flow passage between the two tube portions, wherein said actuating lever is connected to a piston which is loaded by a biasing force towards its position associated with the closing position of the valve flap and is subjected, in the direction of the biasing force, to gas pressure prevailing in the flow passage upstream of the valve flap, the surface of the piston subjected to gas pressure being slightly smaller than the opening cross section of the tube portion covered by the valve flap in its closing position, and wherein the surface of the piston opposite to said first mentioned piston surface can be selectively subjected to a pressure overcoming said biasing force.

35. A throttle valve as defined in claim 34 wherein said piston includes a diaphragm separating a pair of chambers of an actuating cylinder, wherein a push member extending across one of said chambers and projecting therefrom cooperates with said actuating lever and is connected to said piston, and wherein the chamber across which said push member extends is adapted to be communicated to a pressure source and the other of said chamber communicates with the flow passage upstream of said closing plane.

36. A throttle valve as defined in claim 35 wherein said biasing force acts upon a lever such that the active lever arm between the line of action of said biasing force and the axis of rotation of said valve flap decreases in response to a movement of said valve flap towards its opening position, and wherein the torque resulting from said biasing force and said active lever arm is degressive.

37. A throttle valve as defined in claim 35 wherein said valve includes a valve casing and a valve member loaded by a biasing force, wherein said valve casing and said valve member are of cross sections associated to each other such as to form a system of restricted passages which are dimensioned such that the surface of the valve member which is subjected to said ram pressure increases in response to movements of said valve member in a direction opposite to said biasing force.

* * * * *